United States Patent
Jung et al.

(10) Patent No.: US 7,258,782 B2
(45) Date of Patent: Aug. 21, 2007

(54) APPARATUS FOR SAMPLING FILTER LAYER AND METHOD USING THE SAME

(75) Inventors: Jin-Dal Jung, Daejeon (KR); Oen-Ho Shin, Daejeon (KR); Kyo-Nam Choi, Daejeon (KR); Byoung-Geun Oh, Daejeon (KR)

(73) Assignee: Korea Water Resources Corporation (KR)

( * ) Notice: Subject to any disclaimer, the term of this patent is extended or adjusted under 35 U.S.C. 154(b) by 391 days.

(21) Appl. No.: 10/886,190

(22) Filed: Jul. 7, 2004

(65) Prior Publication Data

US 2005/0006287 A1    Jan. 13, 2005

(30) Foreign Application Priority Data

Jul. 7, 2003   (KR) ...................... 10-2003-0045656

(51) Int. Cl.
*G01N 1/08*    (2006.01)
*E02D 1/04*    (2006.01)

(52) U.S. Cl. ..................... 210/94; 210/542; 175/49; 73/864.43

(58) Field of Classification Search ............ 73/864.43, 73/864.44, 864.45; 175/49, 44, 58, 323, 175/203; 210/94, 542
See application file for complete search history.

(56) References Cited

U.S. PATENT DOCUMENTS

| | | | |
|---|---|---|---|
| 4,345,484 A | 8/1982 | Gould et al. | 73/864.43 |
| 6,253,629 B1 * | 7/2001 | Lee et al. | 73/864.45 |
| 2003/0082797 A1 * | 5/2003 | Rastorgoueff et al. | 435/309.1 |

* cited by examiner

*Primary Examiner*—Terry K. Cecil
(74) *Attorney, Agent, or Firm*—Tuchman & Park LLC

(57) ABSTRACT

An apparatus for sampling a filter layer and a method using the same are disclosed herein. The apparatus includes a cylindrical tube made of a transparent material; a screw installed at a central portion in the cylindrical tube, to be rotated for shifting a sample from the lower part to the upper part of the cylindrical tube, and a rotary operating unit fixed to the upper end of the screw for rotating the screw, wherein the cylindrical tube is provided with a scale formed on its outer circumference and a protective cap combined with the lower end for smoothly excavating the filter layer and preventing the damage of the cylindrical tube. The apparatus further lower case a fixed supporter on the upper end of the screw and a supporting hand lever protruding from one side of the fixed supporter to be pressed by a worker with force required for excavation.

2 Claims, 9 Drawing Sheets

APPARATUS FOR SAMPLING FILTER LAYER AND METHOD USING THE SAME

This application claims priority of pending Korean Patent Application No. 2003-45656 filed Jul. 7, 2003.

FIELD OF THE INVENTION

The present invention relates to an apparatus for sampling a filter layer in a filtering basin of a water purification plant and a sampling method using the same, and more particularly to an apparatus sampling a filter medium in a filter layer, which comprises a transparent cylindrical tube for easily sampling the filter layer to detect the states of bound turbid water and particle sizes of strata of the filter layer of a filtering basin, and a screw installed in the cylindrical tube and rotated by the manipulation at the upper part thereof, and a sampling method using the same.

DESCRIPTION OF THE RELATED ART

A filtering step of a water treatment process is a water purification step, in which particles and flock are removed from water by a straining action, in which the particles are caught by interstitial voids of a filter medium, and interception, sedimentation and diffusion actions, in which the particles flowing in the filter medium transverse a streamline and are attached to the filter medium.

Accordingly, the foremost object for designing or operating the filtering step is to maintain filter duration and to improve the quality of filtered water.

Filtering basins are classified into a slow filtering basin and a rapid filtering basin according to filtration velocity, a sand-medium filtering basin and a multi-media filtering basin according to kinds of used filter media, an upward filtering basin and a downward filtering basin according to filtration directions, or etc. The quality of the filtrated water and the time taken to filtrate the water vary based on the state of stratification, the particle size and depth of the filter medium, and the state of back washing of the filter medium. In order to solve various problems, the performance of a water purification plant is evaluated, i.e., technical analysis of the water purification plant is performed. In order to obtain convenient and reliable data through the technical analysis, various devices and apparatuses are required. However, since fields, to which the above devices and apparatuses are applied, are limited, such devices and apparatuses are not developed now.

That is, conventional methods for sampling a filtering basin, which are developed and used now at home and aboard, are divided into a direct excavation method, in which a filter medium of the filtering basin is sampled by excavating the filter layer using a shovel or other excavation tool according to depths and kinds of filter layers of the filtering basin, and another excavation method using a pipe, which is an improved method of the former.

In the direct excavation method using the excavation tool, the broad area of the filtering basin is excavated for sampling each of the filter layers thereof, thereby causing many limits in time and space. In the excavation method using the pipe, it is difficult to directly observe the cross-sections of strata of the filter layers and, in case that the filtering basin is made of a solid filter medium, it is difficult to sample the filter layer having a large depth.

SUMMARY OF THE INVENTION

Therefore, the present invention has been made in view of the above problems, and it is an object of the present invention to provide an apparatus and method for sampling a filter layer of a filtering basin, in which the filter layer is simply and rapidly sampled and a worker directly observes the obtained samples with the naked eye.

In accordance with one aspect of the present invention, the above and other objects can be accomplished by the provision of an apparatus for sampling a filter layer, comprising: a cylindrical tube having a designated length; a screw installed at the central portion in the cylindrical tube, wound in a spiral shape and rotated for shifting the obtained sample from the lower part to the upper part of the cylindrical tube; and a rotary operating unit fixed to the upper end of the screw for rotating the screw, wherein the cylindrical tube is made of a transparent material so that a worker at the outside of the cylindrical tube observes the inside of the cylindrical tube, and provided with a scale formed on the outer circumference thereof in the longitudinal direction, and a protective cap combined with the lower end thereof for smoothly excavating the filter layer and preventing the damage of the cylindrical tube generated when the filter layer is excavated, a fixed supporter is placed on the upper end of the screw, inserted into the upper opened end of the cylindrical tube and provided with a rotary bearing installed therein for the smooth rotation thereof, and a supporting hand lever is protruded from one side of the fixed supporter to the outside of the cylindrical tube for maintaining the balance between the cylindrical tube and the screw when the screw is rotated and allowing the worker to press the supporting hand lever with force required for excavation.

Preferably, the apparatus may further comprise a gauge made of a transparent material having an inner diameter, into which the cylindrical tube is inserted, so that the obtained sample maintaining its stratification is discharged from the inside of the cylindrical tube to the gauge, and is provided with a scale formed on the outer circumference thereof.

In accordance with another aspect of the present invention, there is provided a method for sampling a filter layer, comprising the steps of: (a) vertically erecting the above apparatus on the upper surface of the filter layer of a filtering basin, which is drained; (b) excavating a filter medium of the filter layer to a necessary depth using a screw by allowing a worker to grip a supporting hand lever placed on the upper end of the apparatus with one hand, to press the supporting hand lever with a designated force while maintaining the balance of a cylindrical tube and to rotate a rotary operating unit in a regular (right) direction with the other hand; (c) taking the apparatus, containing the obtained sample of the filter medium, out of the filter layer, and inserting the lower end of the cylindrical tube into a gauge provided with a scale formed on the outer surface thereof; and (d) rotating the rotary operating unit placed on the upper end of the apparatus in the opposite (left) direction and slowly taking the cylindrical tube from the gauge so that the sample placed on the screw in the cylindrical tube is discharged to the inside of the gauge.

BRIEF DESCRIPTION OF DRAWINGS

The above and other objects, features and other advantages of the present invention will be more clearly understood from the following detailed description taken in conjunction with the accompanying drawings, in which.

DESCRIPTION OF PREFERRED EMBODIMENTS

Now, preferred embodiments of the present invention will be described in detail with reference to the annexed drawings.

Figure 1:
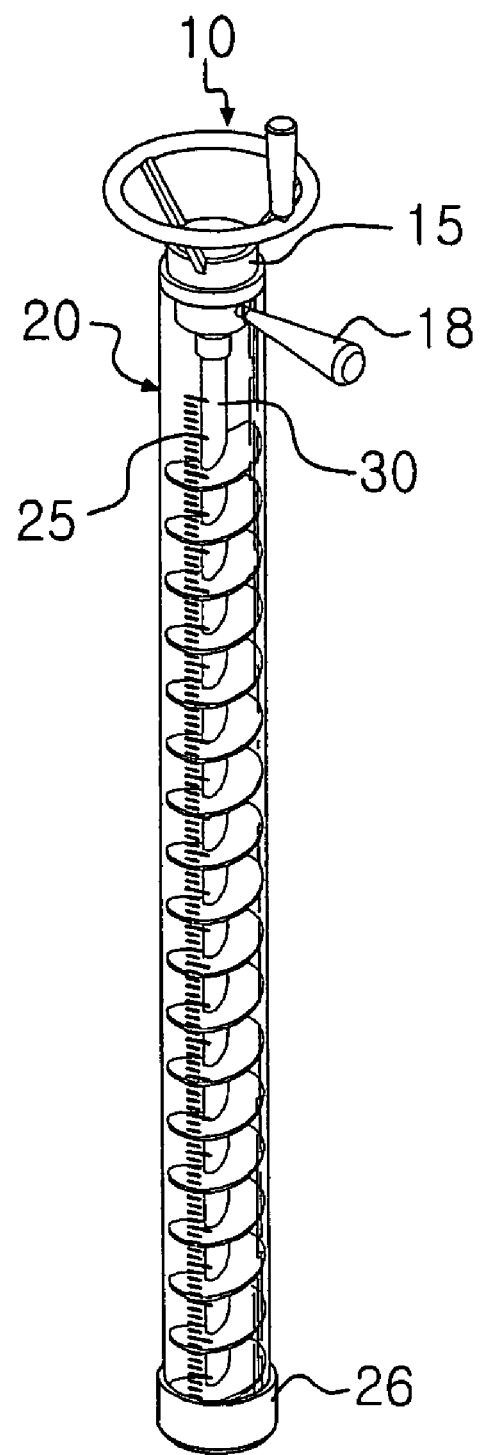
FIG. 1 is a perspective view illustrating the external appearance of an apparatus for sampling a filter layer in accordance with a preferred embodiment of the present invention.
Figure 2:
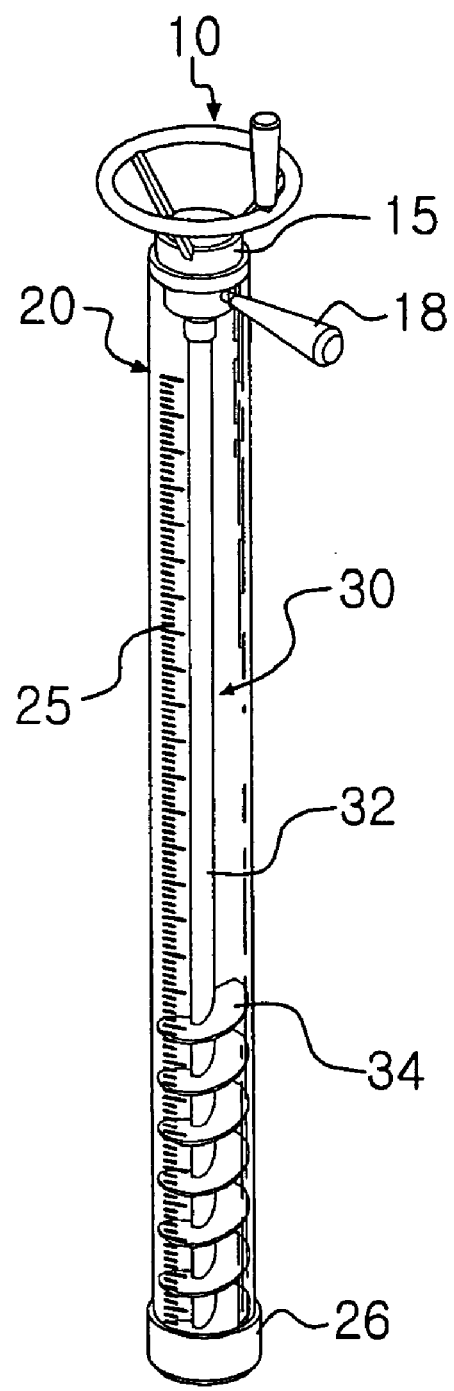
FIG. 2 is a perspective view illustrating the external appearance of an apparatus for sampling a filter layer in accordance with another embodiment of the present invention.
Figure 3:
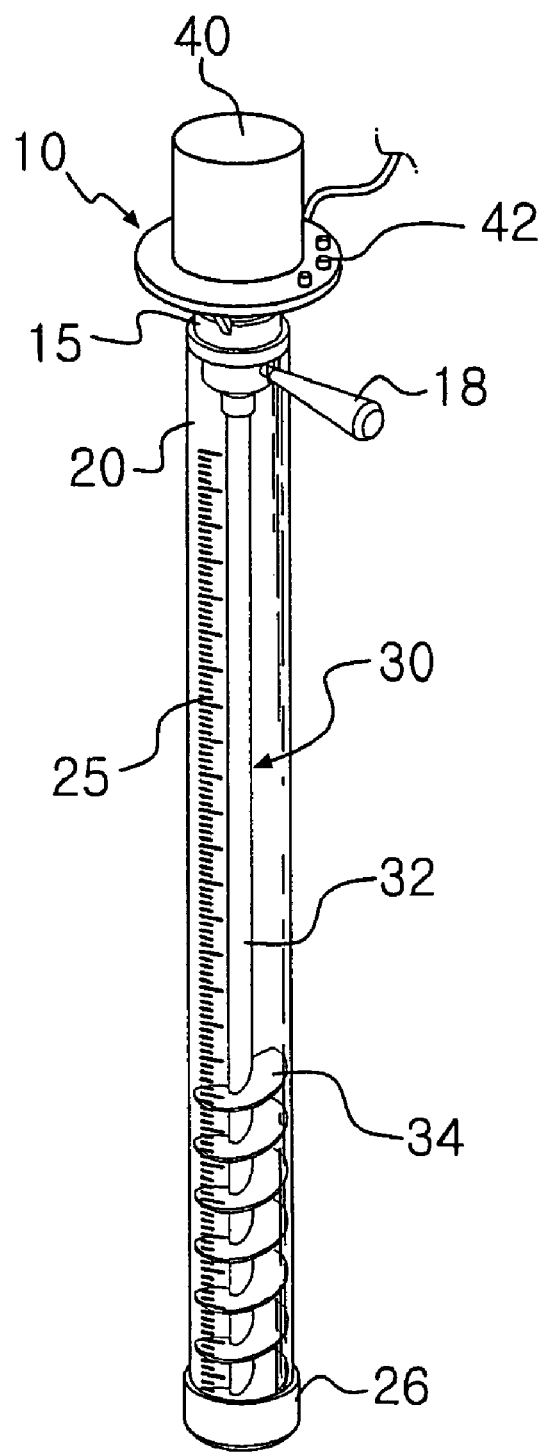
FIG. 3 is a perspective view illustrating the external appearance of an-apparatus for sampling a filter layer in accordance with yet another embodiment of the present invention.
Figure 4:
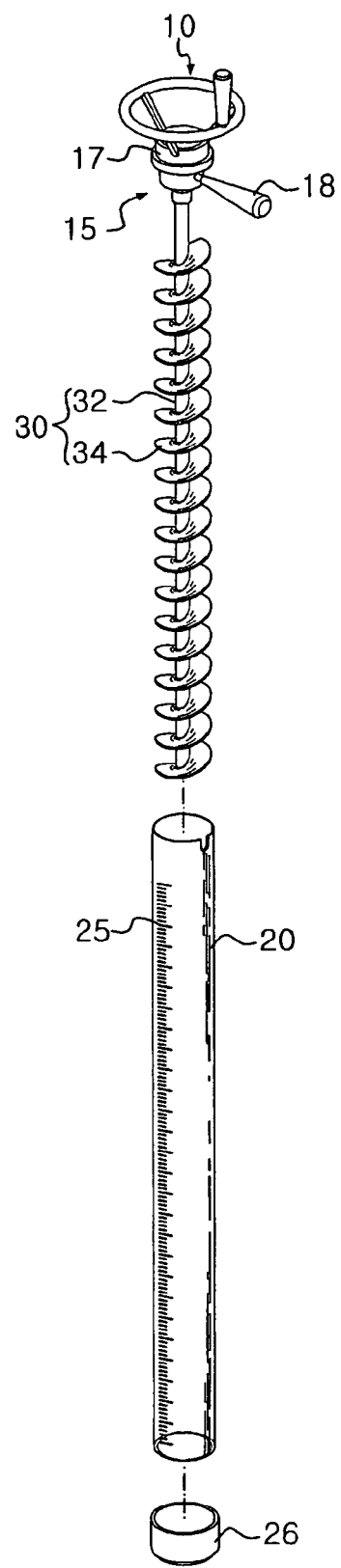
FIG. 4 is an exploded perspective view of the apparatus in accordance with a preferred embodiment of the present invention.
Figure 5:
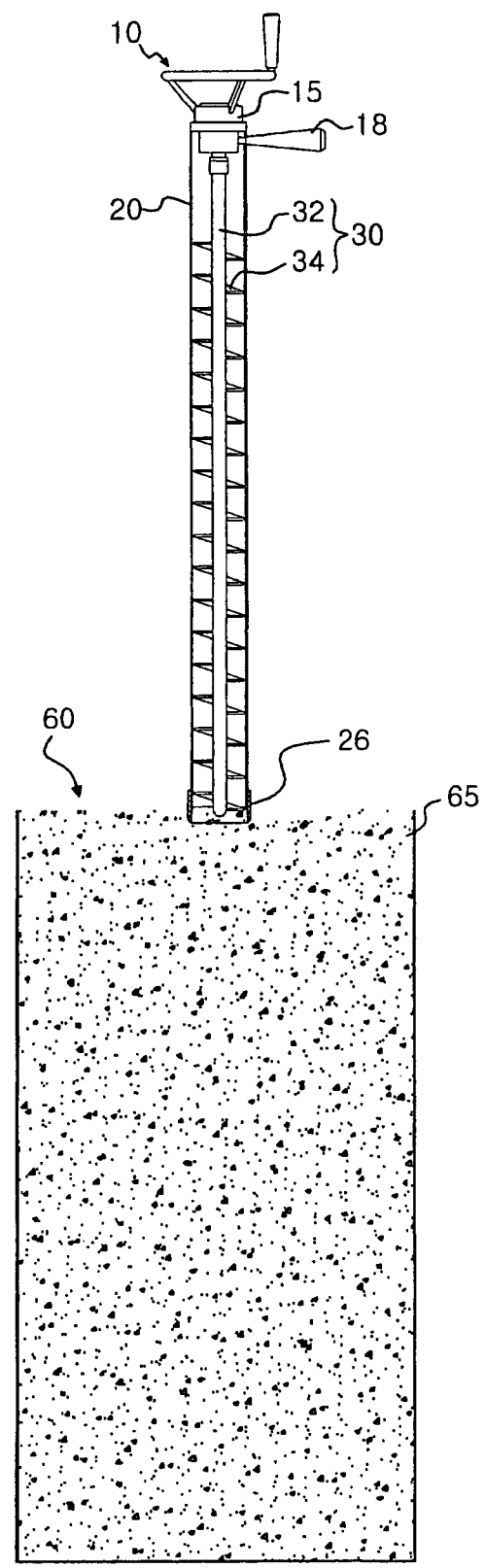
FIGS. 5 to 9 show a process for sampling a filter layer illustrating a method for sampling the filter layer using the apparatus of the present invention.

FIGS. 1 to 3 are perspective views respectively illustrating the external appearances of apparatuses for sampling a filter layer in accordance with embodiments of the present invention, and FIG. 4 is an exploded perspective view of the apparatus in accordance with a preferred embodiment of the present invention.

The apparatus of the present invention comprises a cylindrical tube 20, made of a transparent material, prepared in designated length and diameter, provided with upper and lower opened ends and marked with a scale drawn in the longitudinal direction on the outer circumference thereof, a screw 30 installed in the cylindrical tube 20 to correspond to the length and diameter of the cylindrical tube 20, a rotary operating unit 10 fixed to the upper end of the screw 30 for rotating the screw 30 and exposed from the cylindrical tube 20, a fixed supporter 15 placed on the upper end of a central rotary shaft 32 of the screw 30 and inserted into the upper opened end of the cylindrical tube 20, and a supporting hand lever 18 placed on the outer circumference of the fixed supporter 15 and protruded from one side of the fixed supporter 15 to the outside of the cylindrical tube 20 for maintaining the balance between the cylindrical tube 20 and the screw 30 when the screw 30 is rotated and being pressed by a worker with force required for excavation.

Particularly, a protective cap 26 is combined with the lower opened end of the cylindrical tube 20, and has a sharpened end for allowing the cylindrical tube 20 to be easily inserted into a filter medium and preventing the lower end of the cylindrical tube 20 from being broken by the friction between the cylindrical tube 20 and the filter medium when samples are extracted from the filter medium by excavation. The screw 30 includes the central rotary shaft 32, and a rotary vane 34 formed in a spiral shape on the outer circumference of the central rotary shaft 32 and sliding on the inner circumference of the cylindrical tube 20, when the central rotary shaft 32 is rotated in a regular or opposite direction, for raising and lowering extracted samples introduced from the lower part of the cylindrical tube 20. The rotary vane 34, as shown in FIG. 1, may be formed throughout the overall length of the outer circumference of the central rotary shaft 32, or, as shown in FIG. 2, may be formed on a partial length of the outer circumference of the central rotary shaft 32, thereby being capable of being selectively used according to the depth of the filter layer to be sampled.

The fixed supporter 15 is provided with a bearing 17 installed therein for inserting the outer circumference of the fixed supporter 15 into the cylindrical tube 20, so that the screw 30 is rotated whiling maintaining its balance, thereby allowing the screw 30 to be smoothly rotated in case that a user grips the supporting hand lever 18 and rotates the rotary operating unit 10. Further, as shown in FIG. 3, the fixed supporter 15 is provided with a rotary motor 40 for convenient manipulation, thereby automatically controlling the rotating operation of the screw 30. In case that the fixed supporter 15 is provided with the rotary motor 40, a manipulation unit 42 for rotating the screw 30 is provided on one side of the rotary operating unit 10.

The above-described apparatus of the present invention further comprises a gauge 50 made of a transparent material and provided with a scale 55 formed on the outer circumference thereof so that the state of the stratification of the sample extracted from the filter medium layer is maintained and an outside observer easily views the state of the stratification.

The gauge 50 is manufactured to have designated inner diameter and size so that the cylindrical tube 20 is inserted into the gauge 50 for maintaining the stacked state of a sample, obtained by excavating the filter medium, on the screw 30 of the cylindrical tube 20. Thereby, the screw 30 is rotated in the direction opposite to the regular direction under the condition that the cylindrical tube 20 is inserted into the gauge 50, thus filling the gauge 50 with the sample maintaining the stacked state thereof, taken out of the cylindrical tube 20, so that the state of bound turbid water or the particle size of the filter medium can be tested by the gauge 50.

Hereinafter, with reference to FIGS. 5 to 9, a method for sampling a filter layer using the above-described apparatus will be described in detail.

Figure 9:
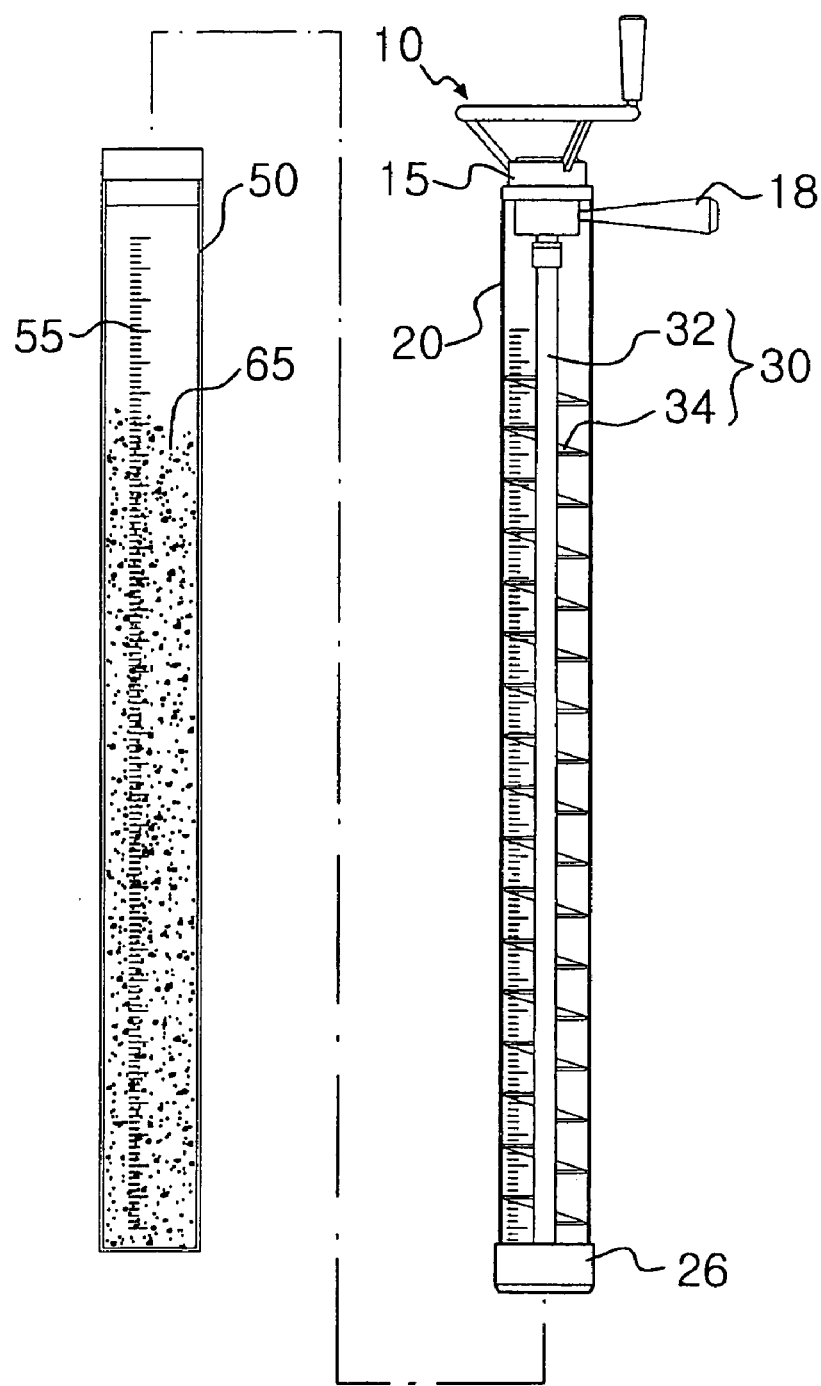

First, as shown in FIG. 9, when a worker grips the supporting hand lever 18 with one hand and downwardly presses the supporting hand lever 18 with a designated force and rotates the rotary operating unit 10 with the other hand under the condition that the apparatus of the present invention is erected on the upper surface of the filter layer 65 of the filtering basin 60, the screw 30 installed in the cylindrical tube 20 is rotated to excavate the filter layer 65.

Figure 6:
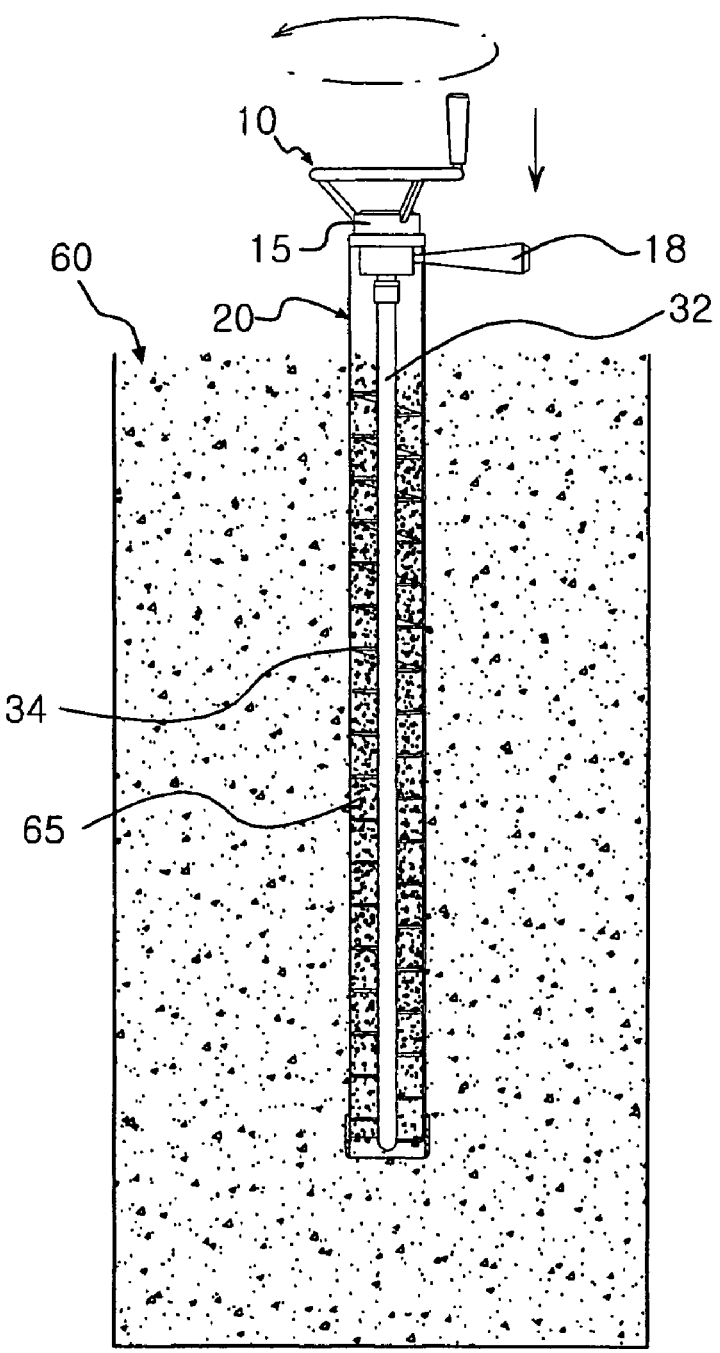

The obtained sample by excavating the filter layer 65 is stacked on the upper surface of the rotary vane 34 of the screw 30 under the condition that the sample maintains the stratification of the filter layer 65, and is shifted from the lower part to the upper part of the cylindrical tube 20 by the rotation of the screw 30. Then, the cylindrical tube 20 is inserted into a hole formed in the filter layer 65 by excavating the filter layer 65, thereby continuously excavating the filter medium of the inner part of the filter layer 65 by the successive rotation of the screw 30. FIG. 6 illustrates the excavated state of the filter layer 65 using the apparatus of the present invention.

Figure 7:
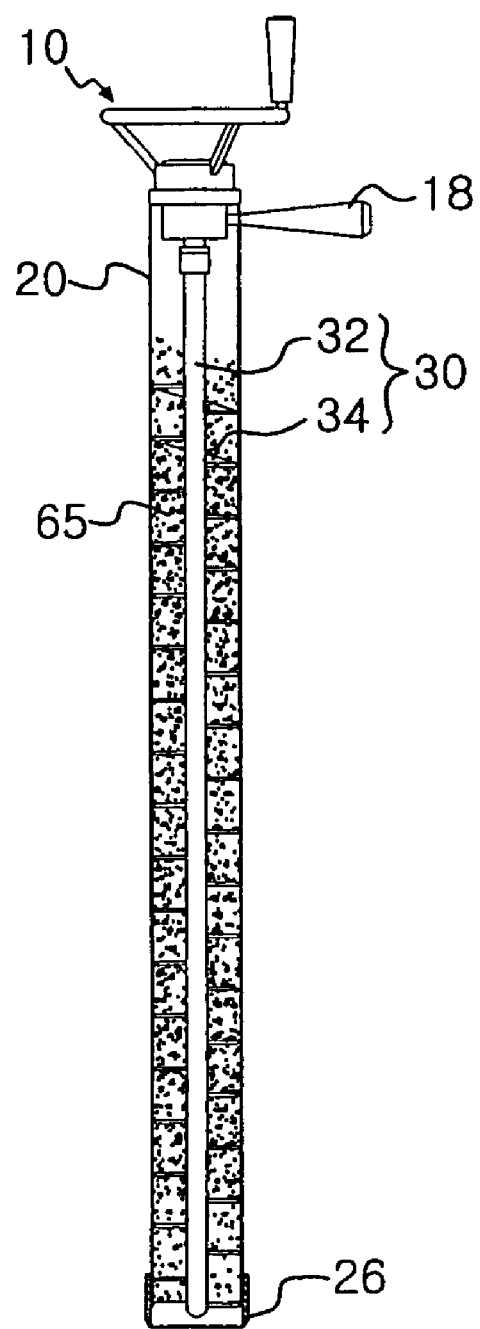
Figure 8:
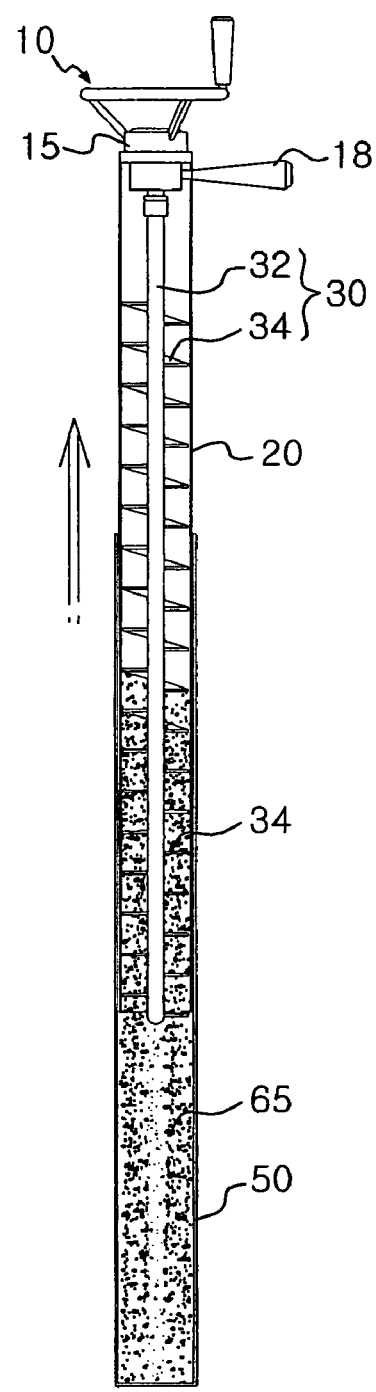

When the filter layer 65 is excavated, the worker measures the depth of the filter layer 65 to be excavated using the scale 25 drawn on the outer circumference of the cylindrical tube 20, and rotates the rotary operating unit 10 in the regular direction until the cylindrical tube 20 reaches the required depth of the filter layer 65. In case that the cylindrical tube 20 excavates the required depth of the filter layer 65, the cylindrical tube 20 is taken out of the filter layer 65, as shown in FIG. 7. The obtained sample by excavating the filter layer 65, which maintains its stratification from the lower portion to the upper portion, is stacked on the rotary vane 34 in the cylindrical tube 20. The cylindrical tube 20 containing the sample of the filter layer 65 is inserted into the gauge 50 made of a transparent material, the rotary operating unit 10 is rotated in the opposite direction while the cylindrical tube 20 slowly rises. Then, as shown in FIGS. 8 and 9, the sample of the filter layer 65, which was stacked on the rotary vane 34 of the screw 30, is discharged from the cylindrical tube 20 and fills the inside of the gauge 50 while maintaining its stratification the same as the initial state of the filter layer 65.

After the gauge 50 is filled with the sample of the filter layer 65, the worker can observe the gauge 50 made of a transparent material with the naked eye so that the stratification and the state of bound turbid water or mixed state of the filter layer 65 are viewed directly by the worker.

Further, the profile of the filter layer 65 is viewed by the worker with the naked eye, and the obtained results of the profile are used as data for analyzing particle sizes of each strata of the filter layer 65 and evaluating efficiency of the filter layer 65.

Particularly, in case that the filter layer 65 is sampled by the apparatus of the present invention, it is possible to sample the filter layer 65 having various depths by adjusting the lengths of the cylindrical tube 20 and the screw 30. Even when the cylindrical tube 20 has a short length, the filter layer 65 at various positions having different depths can be sampled by allowing the cylindrical tube 20 to repeatedly excavate the filter layer 65 through a hole obtained by first excavating the filter layer 65.

Further, particularly, in case that the rotary motor 40 and the manipulation unit 42 are provided on the rotary operating unit 10 in accordance with yet another embodiment of the present invention, it is possible to sample the filter layer 65 by the simple manipulation of operating buttons provided on the manipulation unit 42 without rotating the rotary operating unit 10 by hand, thereby allowing the rotary operating unit 10 to be more simply operated in a short period of time.

Moreover, in case that the filter layer is sampled by the apparatus of the present invention, it is possible to sample the filter layer at an area in the limited range, while the conventional apparatus excavates the filter layer throughout the broad area, thereby solving inconveniences and difficulties generated by the conventional apparatus.

As apparent from the above description, the present invention provides an apparatus and method for sampling a filter layer of a filtering basin, in which a worker can simply sample the filter layer, the obtained sample maintains stratification of the filter layer, and the worker observes mixing conditions of the obtained sample with the naked eye, thereby efficiently performing technical analysis of a filtration process for testing the particle size of the filter layer according to the depth, and the bound turbid water of the filter layer.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for sampling a filter layer, comprising:
   a cylindrical tube having a designated length;
   a screw installed at a central portion in the cylindrical tube, wound in a spiral shape and rotated for shifting the obtained sample from a lower part to an upper part of the cylindrical tube; and
   a rotary operating unit fixed to an upper end of the screw for rotating the screw,
   wherein the cylindrical tube is made of a transparent material so that a worker at the outside of the cylindrical tube observes the inside of the cylindrical tube, and provided with a scale formed on the outer circumference thereof in a longitudinal direction, and a protective cap combined with a lower end of said cylindrical tube for smoothly excavating the filter layer and preventing the damage of the cylindrical tube generated when the filter layer is excavated, a fixed supporter is placed on the upper end of the screw, inserted into an upper opened end of the cylindrical tube, and said fixed supporter is provided with a rotary bearing installed therein for the smooth rotation of the screw, and a supporting hand lever is protruded from one side of the fixed supporter to the outside of the cylindrical tube for maintaining the balance between the cylindrical tube and the screw when the screw is rotated and allowing the worker to press the supporting hand lever with force required for excavation, and further comprising a gauge made of a transparent material having an inner diameter, into which the cylindrical tube is inserted, so that the obtained sample maintaining its stratification is discharged from the inside of the cylindrical tube to the gauge, and is provided with a scale formed on the outer circumference thereof.

2. A method for sampling a filter layer, comprising the steps of:
   (a) providing an apparatus comprising:
   a cylindrical tube having a designated length;
   a screw installed at a central portion in the cylindrical tube, wound in a spiral shape and rotated for shifting the obtained sample from a lower part to an upper part of the cylindrical tube; and
   a rotary operating unit fixed to an upper end of the screw for rotating the screw,
   wherein the cylindrical tube is made of a transparent material so that a worker at the outside of the cylindrical tube observes the inside of the cylindrical tube, and provided with a scale formed on the outer circumference thereof in a longitudinal direction, and a protective cap combined with a lower end of said cylindrical tube for smoothly excavating the filter layer and preventing the damage of the cylindrical tube generated when the filter layer is excavated, a fixed supporter is placed on the upper end of the screw, inserted into an upper opened end of the cylindrical tube, and said fixed supporter is provided with a rotary bearing installed therein for the smooth rotation of the screw, and a supporting hand lever is protruded from one side of the fixed supporter to the outside of the cylindrical tube for maintaining the balance between the cylindrical tube and the screw when the screw is rotated and allowing the worker to press the supporting hand lever with force required for excavation,
   and further comprising a gauge made of a transparent material having an inner diameter, into which the cylindrical tube is inserted, so that the obtained sample maintaining its stratification is discharged from the inside of the cylindrical tube to the gauge, and is provided with a scale formed on the outer circumference thereof;
   (b) vertically erecting the apparatus on the upper surface of the filter layer of a filtering basin, which is drained;

(c) excavating a filter medium of the filter layer to a necessary depth using a screw by allowing a worker to grip a supporting hand lever placed on the upper end of the apparatus with one hand, to press the supporting hand lever with a designated force while maintaining the balance of a cylindrical tube and to rotate a rotary operating unit in a regular (right) direction with the other hand;

(d) taking the apparatus, containing the obtained sample of the filter medium, out of the filter layer, and inserting the lower end of the cylindrical tube into a gauge provided with a scale formed on the outer surface thereof; and (e) rotating the rotary operating unit placed on the upper end of the apparatus in the opposite (left) direction and slowly taking the cylindrical tube from the gauge so that the sample placed on the screw in the cylindrical tube is discharged to the inside of the gauge.

* * * * *